United States Patent [19]
Ward

[11] Patent Number: 5,198,010
[45] Date of Patent: Mar. 30, 1993

[54] METHOD AND APPARATUS FOR CONVEYING MOLTEN GLASS

[76] Inventor: Clive Ward, 9 Bell's Court, Pottergate, Helmsley, Yorkshire Y06 5DQ, Great Britain

[21] Appl. No.: 786,079

[22] Filed: Oct. 31, 1991

[30] Foreign Application Priority Data

Oct. 31, 1990 [GB] United Kingdom ............... 9023638

[51] Int. Cl.⁵ .............................................. C03B 5/16
[52] U.S. Cl. ...................................... 65/135; 65/346; 65/356
[58] Field of Search ................. 65/346, 135, 136, 356

[56] References Cited

U.S. PATENT DOCUMENTS

| | | | |
|---|---|---|---|
| 1,893,061 | 1/1933 | Peiler | 65/346 |
| 2,771,711 | 11/1956 | Long | 65/346 |
| 3,475,151 | 10/1969 | Briggs | 65/135 X |
| 3,856,496 | 12/1974 | Nesbitt et al. | 65/135 X |
| 4,294,603 | 10/1981 | Winzer et al. | 65/136 X |
| 4,604,123 | 8/1986 | Desprez et al. | 65/346 X |
| 4,655,812 | 4/1987 | Blumenfeld | 65/346 |

Primary Examiner—Robert L. Lindsay
Attorney, Agent, or Firm—Collard & Roe

[57] ABSTRACT

The present invention provides a molten glass conveying apparatus comprising a channel (4) along which molten glass may flow, a roof structure (6) over the channel (4) and extending between the two sides thereof and at least one nozzle (28) in the roof structure (6) through which a heating fluid may be passed, wherein in use the direction of the output of the heating fluid from the nozzle (28) is substantially along the channel (4) whereby at least one side portion of the molten glass is heated.

8 Claims, 3 Drawing Sheets

METHOD AND APPARATUS FOR CONVEYING MOLTEN GLASS

FIELD OF THE INVENTION

The present invention relates to molten glass conveying apparatus and methods of conveying molten glass.

REVIEW OF THE ART KNOWN TO THE APPLICANTS

The invention is described with respect to its applicability in glass forehearths. However, the invention is not limited to these forehearths since it additionally finds uses in, for instance, the working ends of glass manufacturing furnaces.

The forehearth is located between a glass melting tank and a feeder bowl which provides molten gobs to be fed into glassware forming machines. A typical forehearth comprises a refractory channel along which the molten glass flows and which is provided with an insulating roof.

It is known that the temperature of the glass is not homogeneous throughout its cross-section. The glass tends to be cooler at its side portions compared to the temperature of the molten glass at the centre of the channel. This is due to the cooling effect of the side walls of the channel. The temperature differences result in differing viscosities which themselves result in a range of molten glass velocities across the channel. It is also normally a requirement that the molten glass be at a lower temperature than the furnace exit temperature.

In practice it has been found that to overcome the problem outlined above the side portions of the stream of molten glass require heating whilst the centre portion requires cooling.

Various suggestions for achieving the heating and cooling of the portions of the molten glass stream are made in the following patent specifications: GB 1 452 351 (Societe Generale Pour L'Emballage), UK 355 555 (Jackson), EP 0 145 427 (Emhart), EP 0 275 345 (Emhart), U.S. Pat. No. 1,893,061 (Peiler), U.S. Pat. No. 1,970,094 (Honiss), U.S. Pat. No. 3,582,310 (Avery), U.S. Pat. No. 3,999,972 (Brax), WO 83/01440 (BHF) and DE 3 119 816 (Sorg).

The proposals that involve the use of a heating fluid (e.g. a gas-air flame) above the molten glass have nozzles which fire the heating fluid from the side walls of the forehearth transverse to the direction of flow of the molten glass or, as in the case of U.S. Pat. No. 1,893,061 (Peiler) a nozzle in an angled, complex section of the roof of the forehearth which directs the heating fluid into a firing chamber constituted by a space above the molten glass adjacent to the feed spout, the heating fluid then passes rearwardly along the surface of the glass in opposite side portions of the forehearth channel to stacks which induce the flow of the gasses out to the atmosphere.

The side burner arrangements in the prior proposals require a plurality of burners for a short section of forehearth and the flames from the burners may extend to the centre of the glass stream resulting in the need for extra cooling of the centre of the glass stream. The roof firing arrangement suggested in U.S. Pat. No. 1,893,061 (Peiler) requires a complex refractory arrangement and detailed management of the stacks to control the molten glass temperature.

The required cooling is achieved in several ways, for instance, by radiation from openings in the sides or roof, by air jets fired from the side walls directed onto the central region of the internal roof structure, longitudinal air flows on the inside of the centre of the roof along the channel or from longitudinal air flows on the outside of the centre of the roof. All except the first of these methods of cooling act by reducing the temperature of the central portion of the roof refractory and by the roof absorbing heat from the glass.

SUMMARY OF THE INVENTION

According to a first aspect of the present invention there is provided a molten glass conveying apparatus comprising a channel along which molten glass may flow, a roof structure over the channel and extending between the two sides thereof and at least one nozzle in the roof structure through which a heating fluid may be passed, wherein in use the direction of the output of the heating fluid from the nozzle is substantially along the channel whereby at least one side portion of the molten glass is heated.

According to a second aspect of the present invention there is provided a method of conveying molten glass along a channel comprising passing a heating fluid through at least one nozzle in a roof structure over the channel, which roof structure extends between the two sides of the channel, wherein the direction of the output of the heating fluid from the nozzle is substantially along the channel whereby at least one side portion of the molten glass is heated.

Preferably the vector component of the output of the heating fluid along the channel is at least twice the magnitude of the other vector components.

Preferably said at least one nozzle for the heating fluid is provided in a roof member of the roof structure.

Preferably at least one nozzle is provided through which a cooling fluid may be passed, and, in use, the direction of the output of the fluid from the cooling fluid nozzle is substantially along the channel whereby the central portion of the molten glass is cooled.

Preferably in the apparatus described above, at least two nozzles for heating fluid are provided in the roof member spaced substantially symmetrically on each side of the or each cooling fluid nozzle.

Suitably in apparatus described in the paragraph above the roof member rests directly upon the two side walls of the channel.

In any of the above apparatus it is preferred that one or more of the nozzles make use of the coanda effect.

Most suitably, all nozzles make use of the coanda effect.

BRIEF DESCRIPTION OF THE DRAWINGS

The invention will now be described, by way of example only, with reference to the following drawings, wherein.

DESCRIPTION OF THE PREFERRED EMBODIMENTS

Figure 1:
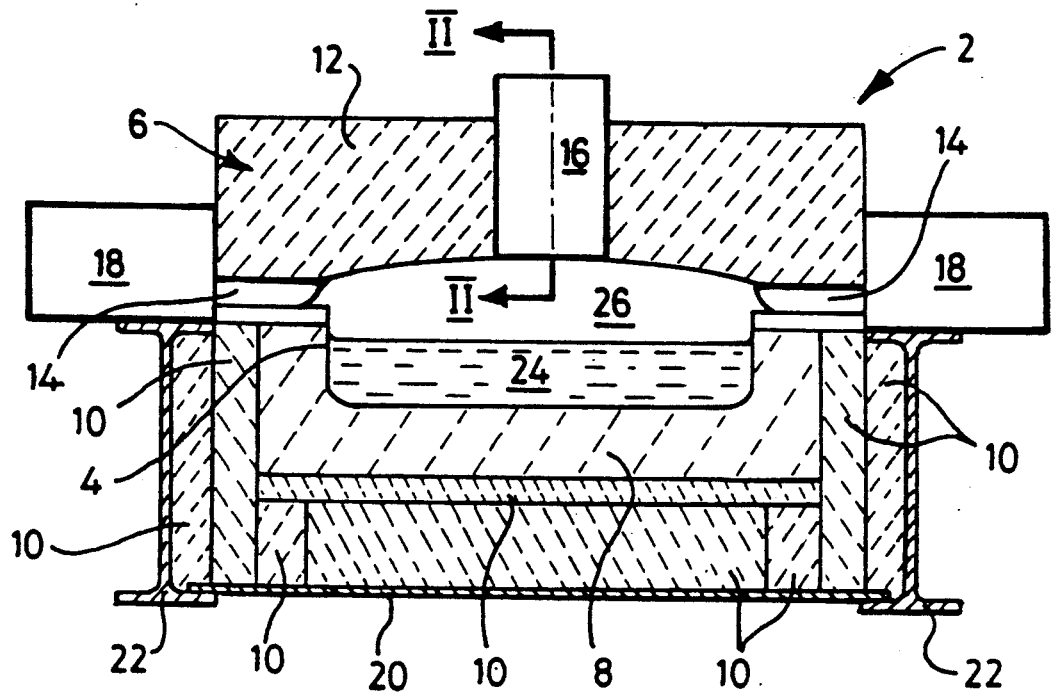
FIG. 1 is a schematic cross-sectional view of a forehearth according to a first embodiment of the present invention.

Referring now to FIG. 1 of the drawings that follow, there is shown a forehearth 2 comprising an elongate channel 4 which is defined between a roof structure 6 and an elongate, cross-sectionally U-shaped refractory member 8. The refractory member 8 is supported by secondary elongate refractory members 10 which are rectangular in cross-section.

Contained in the channel 4 there is shown a mass of molten glass 24, above which is shown an open volume 26 within the channel 4.

The roof structure 6 comprises an elongate roof member 12 which is a truncated n-section and extends between the two sides of the channel 4 and two elongate side walls 14 which are rectangular in cross-section. The roof member 12 and side walls 14 are made from refractory materials. Near the working end of the forehearth 2, where the molten glass enters the forehearth, the roof member 12 has a centrally located cooling unit 16. Similarly, there are heating units 18 located on each of the side walls 14 near the working end of the forehearth 2. In this case the cooling unit 16 is substantially identical to the heating units 18, although each of the units 16, 18 is independently controlled.

The entire forehearth 2 is supported by an elongate support member 20 which itself is maintained between two elongate I-section bars 22.

The method of operation of the embodiment of the present invention shown in FIG. 1 will now be described.

The glass is melted in a melting station and then flows to the working ends and then through the forehearth 2 where the molten glass 24 is conditioned. The refractory 8 is therefore formed from a material that reacts as little as possible with the molten glass 24 at the conditioning temperatures.

To provide as homogeneous a glass flow as possible the molten glass 24 is heated at its side portions and cooled along its central region. The heating is carried out by heating units 18; the cooling by cooling unit 16.

These units 16, 18 are supplied with a combustible gas (e.g. propane) and air to support combustion from gas supply cylinders (not shown).

Each unit 16, 18 projects a flame constituted by the ignited gases along the channel, i.e. the direction of the flame is such that the vector component of the flame longitudinally in the channel is greater than each of the vector components in directions orthogonal to the longitudinal axis of the channel. In some embodiments the longitudinal component will be greater than twice the magnitude of each of the other components. In some particularly preferred embodiments the flame constituted by the ignited gases will be substantially along the roof of the channel. In any event, the heating fluid is projected along the channel either in a direction that is the same as the glass flow or against it in at least one vector component the flow of heating fluid does not include vector components in both said directions.

The direction of the output of heating fluid from the nozzle is determined by making a series of ten measurements of the heating fluid over a period of time. A photographic or video image is produced of the ignited heating fluid in the channel. The point at which part of the ignited heating fluid is furthest from the centre of the exit of the nozzle is established and the vector quantity between these two points comprises a single measurement. An average (mean) of ten of these measurements over a period of time during which all other factors are nominally constant gives a direction of the output of the heating fluid from the nozzle 28.

Figure 2:
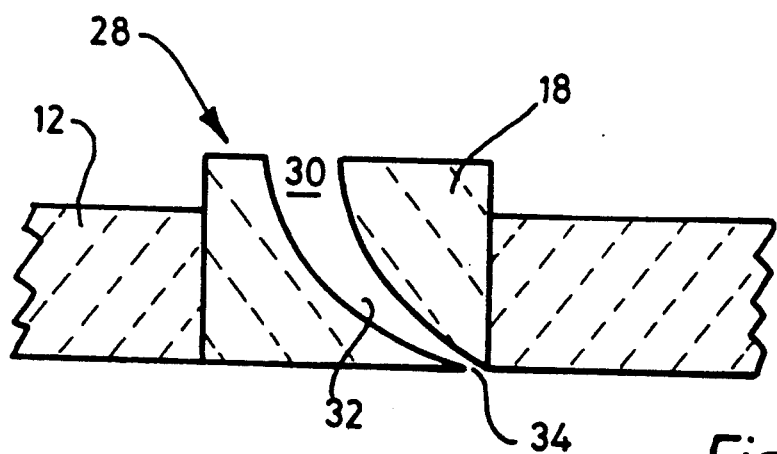
FIG. 2 is a schematic cross-sectional view along the line II—II in FIG. 1.

As the cooling and heating units 16 and 18 respectively are substantially identical a typical heating unit 18 will be described. The gas and air are supplied under pressure to the unit and ejected into the open volume 26 of the channel 4; through a nozzle 28 the output part of which is shown in FIG. 2. The nozzle 28 can be seen in the heating unit 18. The channel of the nozzle comprises a wide section 30 a narrowing section 32 and an exit 34. The gas and air mix is pumped, under pressure into the wide section 30 of the nozzle 28 and a jet of the gas-air mix is produced along the narrowing section 32 so that the heating fluid flows out of the exit 34 at an increased speed.

The gas-air mixture is ignited before it exits the nozzle by a standard lighting means (not shown). The gas-air mixture that constitutes the heating fluid is projected along the open volume 26 making use of the natural phenomenon known as the 'Coanda effect' which is the term given to the tendency of a fluid jet to attach itself to a downstream surface roughly parallel to the jet axis. If this surface curves away from the jet the attached flow will follow it, deflecting from the original direction. Thus in the present case a jet can be introduced into the unit at a given angle to the longitudinal axis of the channel, and its direction changed using the Coanda effect so that the jet emitted from the nozzle 28 is along the channel. The fluid flow conditions of the heating fluid and the configuration of the nozzle 28 determine the direction of the output of heating fluid from the nozzle 28 in a manner which can be readily determined by those skilled in the art.

In this embodiment the heating units 18 are located in the side walls 14 of the forehearth 2. Using the Coanda effect the heating fluid may be projected along the channel close to the side walls thus heating the side portions of the molten glass. Effectively, the flame is fired along the channel. The temperature of the heating fluid can be controlled by varying the mixture of gas and air supplied to the nozzle 28, as is well known in the art.

The cooling unit 16 operates in a similar fashion at a lower temperature. The fluid flow may comprise a flow of air without any flammable gas. The roof member 12 may include a corridor along which the cooling fluid may flow. The direction of a non-ignited cooling fluid may be determined by substituting that fluid for a heating fluid, igniting it and using the method of measurement described hereinabove.

The temperature of the molten glass is determined either by optical pyrometers or thermocouples (neither shown) in the channel 4. These instruments are monitored to determine the occurrence of any temperature differentials which can then be equalised using the cooling and/or heating units 16, 18. The instrument monitoring and temperature control can be carried out by a computer to enable the forehearth to be automated.

The remaining embodiments of the present invention operate in much the same fashion as the first embodiment and require only a brief explanation to facilitate understanding by those skilled in the art. The components are substantially identical, they are simply repositioned. In these latter embodiments like numerals identify like parts.

Figure 3:
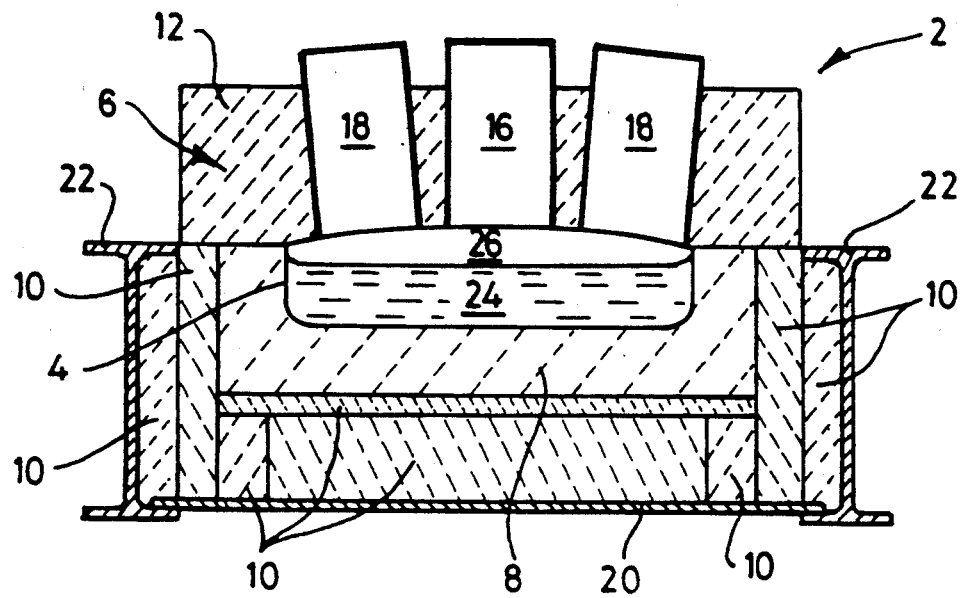
FIG. 3 is a schematic cross-sectional view of a forehearth according to a second embodiment of the present invention.
Figure 4:
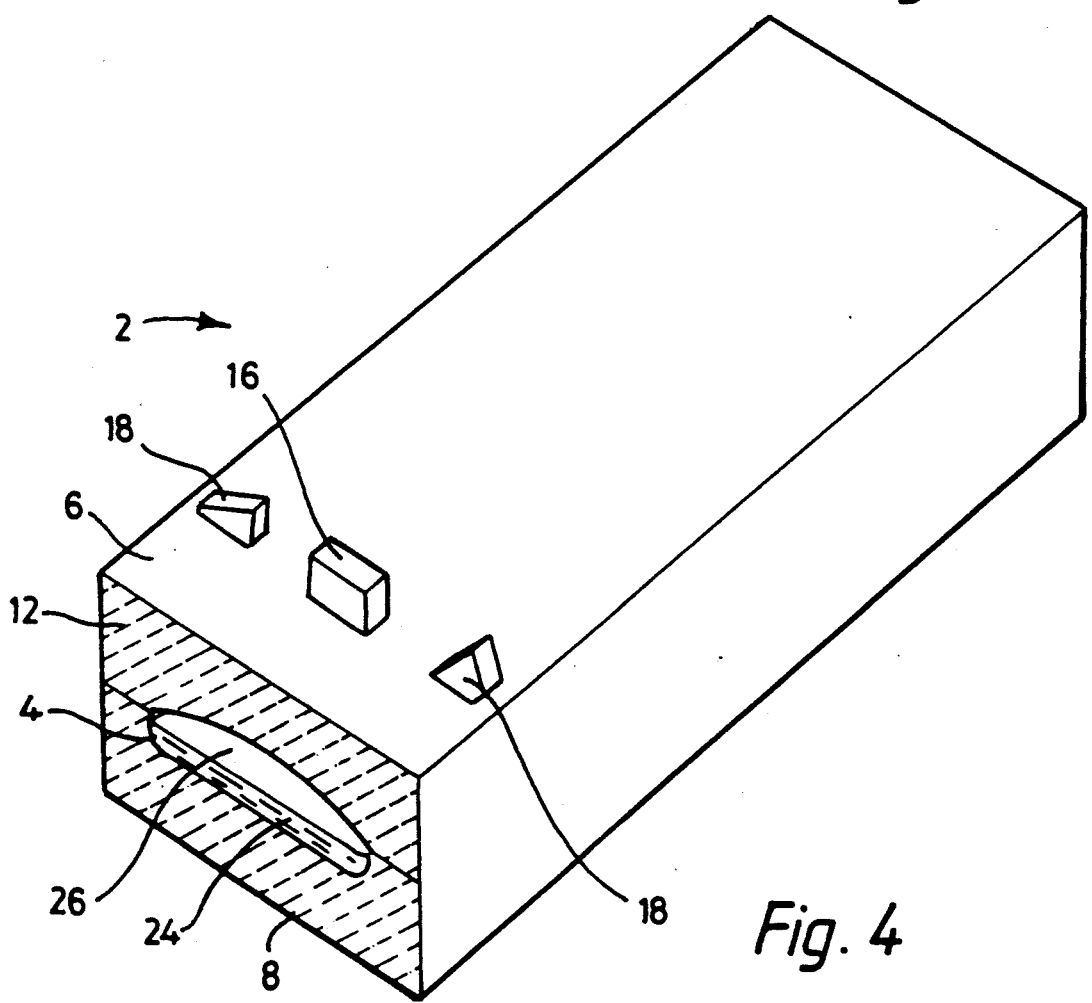
FIG. 4 is a diagrammatic perspective view of the forehearth illustrated in FIG. 3.

FIGS. 3 and 4 of the drawings that follow shows a molten glass channel with a roof member 12 over the channel extending between the two sides thereof. Although in this case the roof member 12 is shown resting directly on the U-shaped refractory member 8 it is possible for various sizes of side walls 14 to be used to space the roof member 12 from the molten glass 24.

In this second embodiment the cooling and heating units 16, 18 are located in the roof member 12. Again the Coanda effect is used to project the heating fluid substantially along the channel so that the heating units heat the side portions of the molten glass whilst the cooling unit cools the central region.

This embodiment has the advantage that the space between the glass 24 and the roof member 12 is substantially reduced thereby enabling better control of the molten glass temperature.

Figure 5:
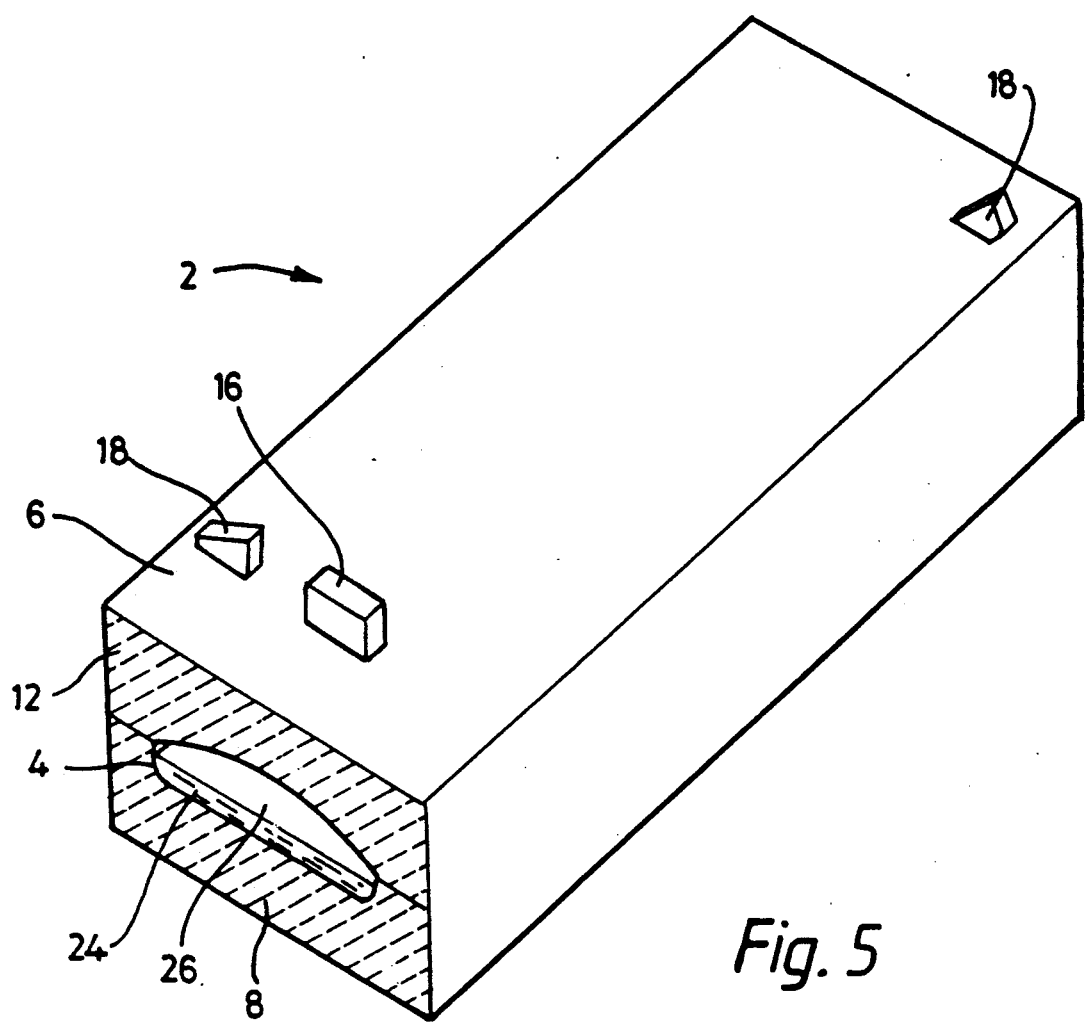
FIG. 5 is a diagrammatic perspective view of a forehearth according to a third embodiment of the present invention.

The third embodiment shown in FIG. 5 of the drawings that follows includes a heating unit 18 located at the upstream end of the conditioning zone of the forehearth 2. This heating unit 18 projects its heating fluid upstream (relative to the direction of flow of the molten glass 24) along the channel allowing a recirculating heating mode. Many similar arrangements of upstream and downstream firing cooling and heating units 16, 18 can be utilised. Furthermore, a heating or cooling unit can be located both at the upstream and downstream ends of the forehearth 2. The actual placement of the units will depend on the field results for the furnace and conditions used.

Again this third embodiment has the advantage that the roof member 12 can be close to the molten glass 24.

Nozzles using the Coanda effect have the advantage that there does not need to be any projection of the nozzle structure into the channel 4. This simplifies the flow conditions in the channel.

Figure 6:
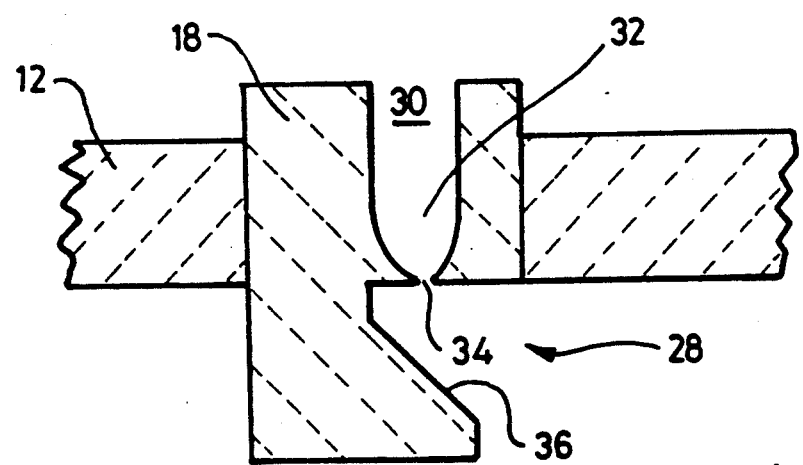
FIG. 6 is a schematic cross-sectional view similar to FIG. 2, showing an alternative nozzle design.

However, the invention is not limited to the use of Coanda effect burners. Other heating means can be readily employed to cause the direction of the output of the heating fluid from the nozzle to be substantially along the channel. For instance, a nozzle can be used having the construction shown in FIG. 6 of the drawings that follow. This is a conventional jet nozzle with a deflector plate 36 formed of a refractory material. The deflector plate 36 causes the flow of heating fluid to be projected along the channel 4. The deflector plates forms part of the nozzle 28 since the direction of the heating fluid is substantially governed by the nozzle 28. The path of the heating fluid is substantially unidirectional once it has left the nozzle 28. Other nozzle designs may be used to achieve the same effect in the present invention.

Although the Coanda effect can be used to advantage in the cooling unit 16 the invention is not limited to this embodiment. Any of the conventional methods of cooling discussed above may be used in a molten glass conveying apparatus according to the present invention.

Furthermore, other methods of heating may be used to assist the heating caused by the present invention. For instance, electrical heating can be used in the refractory member 8 to reduce the cooling of the side portions of the molten glass 24.

It should be noted that the forehearth 2 can comprise several sections each of which may include a heating means according to the present invention. Alternatively, heating means according to the present invention may be combined with conventional heating means in one or more sections of the forehearth.

It should also be noted that the roof structure 6 is normally substantially parallel to the molten glass surface longitudinally along the channel along, at least, that part of the channel between the nozzle 28 and the furthest extremity reached by the heating fluid. Thus a combustion, or burner chamber is not required reducing the complexity of the roof structure 6 and allowing more favourable control of the temperature conditions within the forehearth.

Thus the present invention provides a glass conveying apparatus and method which reduces the number of burners required for a given section of the forehearth, enables heating of the molten glass without the flames extending to the centre of the glass stream allow simpler and cheaper refractory and burner equipment to be used, with roof firing the side walls can be more adequately insulated and even with side-wall firing the reduction in the number of burners allows the side-walls to be more adequately insulated in this case as well. Furthermore, the present invention allows the provision for heat recovery equipment alongside the heating means to be more easily and conveniently arranged.

We claim:

1. A molten glass conveying apparatus comprising:
   channel means having a base and side structures for housing molten glass to be conveyed;
   roof means connected to said side structures and extending over the channel means;
   at least two nozzle means provided in the roof means for the purpose of heating the molten glass wherein the nozzle means are located so that fluid flowing from the nozzle means is made to strike the outermost portions of the molten glass and so then flow along the channel.

2. Apparatus as claimed in claim 1,
   wherein the vector component of the output of the heating fluid along the channel is at least twice the magnitude of the other vector components.

3. Apparatus as claimed in claim 1,
   wherein said at least two nozzles for the heating fluid are provided in a roof member of the roof means.

4. Apparatus as claimed in claim 1,
   wherein a further nozzle is provided through which a cooling fluid is passed and the direction of the output of the fluid from the cooling fluid nozzle is substantially along the channel whereby the central portion of the molten glass is cooled.

5. Apparatus as claimed in claim 4,
   wherein said two nozzle means for heating fluid are provided in the roof member spaced substantially symmetrically on each side of the nozzle for the cooling fluid.

6. Apparatus as claimed in claim 5,
   wherein the roof member rests directly upon the two side structures of the channel.

7. Apparatus as claimed in claim 1,
   wherein each nozzle in the roof is adjacent to a side structure.

8. A method of conveying molten glass along a channel having a roof comprising:
   directing a flow of molten glass along the channel, said channel having outermost sides; and
   passing a heating fluid through at least two nozzles in said roof so that the heating fluid is directed towards, one to each side of, the flowing molten glass so that the heating fluid is then made to flow along the outermost sides of the channel.

* * * * *